F. L. MORSE.
ADJUSTABLE BEARING AND COUPLING FOR PULLEYS.
APPLICATION FILED MAR. 17, 1914.
1,171,347.
Patented Feb. 8, 1916.
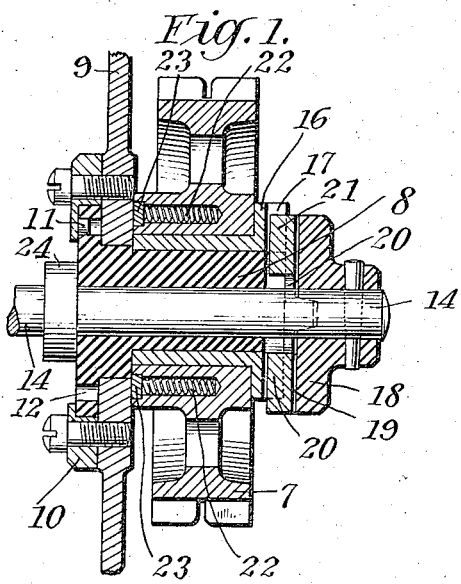
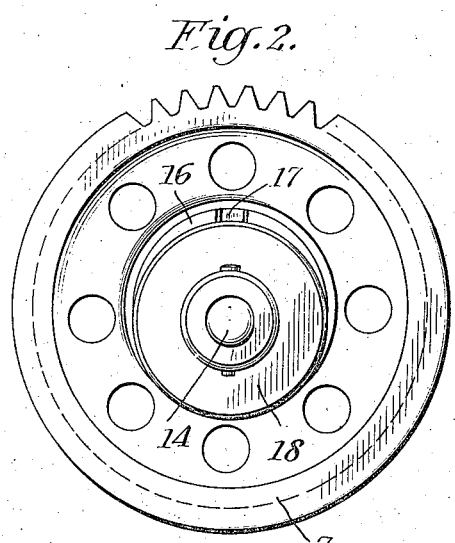
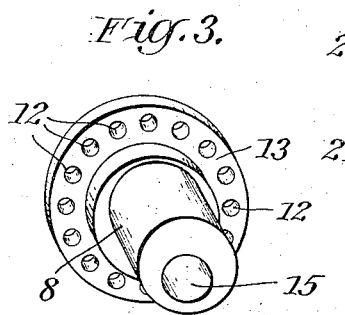
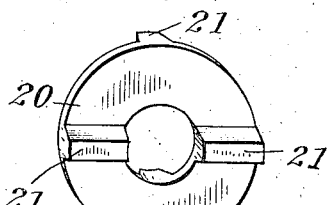
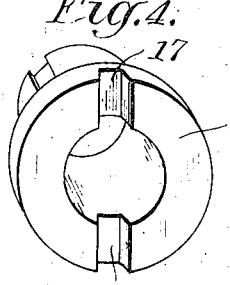
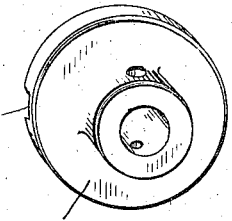
WITNESSES
INVENTOR
Frank L. Morse
BY
Edward H. Wright
ATTORNEY

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

ADJUSTABLE BEARING AND COUPLING FOR PULLEYS.

1,171,347.  Specification of Letters Patent.  Patented Feb. 8, 1916.

Application filed March 17, 1914. Serial No. 825,213.

*To all whom it may concern:*

Be it known that I, FRANK L. MORSE, a citizen of the United States, residing at Ithaca, in the county of Tompkins and State of New York, have invented a certain new and useful Improvement in Adjustable Bearings and Couplings for Pulleys, of which improvement the following is a specification.

This invention relates to adjustable bearings for sprocket wheels, belt wheels, gear wheels, or other pulleys in which the wheel is mounted on a transversely adjustable bearing and is connected through a suitable coupling with the driving or driven member or shaft. In some installations of driving mechanism from one shaft to another, as for instance between the crank shaft and the timed shafts of a gas engine, it is very desirable to maintain accurate angular relation between said shafts, and as this relation is varied and disturbed to some extent by the lengthening of the belt or sprocket chain due to wear in driving, I have provided an improved means for transversely adjusting the bearing of one of said wheels and for coupling the same to its shaft through a suitable driving connection, whereby the proper angular relation between the shafts may be maintained and the looseness of the belt or chain may be taken up as desired.

Another feature of my improvement relates to means for automatically taking up the wear in the coupling connecting the pulley to its operating shaft. These and other features of my invention will now be more fully described and claimed.

In the accompanying drawings: Figure 1 is a longitudinal sectional view of an adjustable bearing and coupling embodying my improvement; Fig. 2, an elevation thereof; Fig. 3, a perspective view of the eccentric bearing member; Fig. 4, a similar view of the bushing and coupling member adapted to be fixed to the pulley or sprocket wheel; Fig. 5, a similar view of the coupling member adapted to be fixed to the shaft; and Fig. 6, a similar view of the intermediate coupling member.

According to the construction shown in the drawing, the pulley or sprocket wheel, 7, is mounted on the eccentric bearing member, 8, which is rotatably mounted in the frame or support, 9, in which it may be adjusted and held in any given position by means of the clamping ring, 10, secured to the frame by bolts or screws and having a projection or pin, 11, adapted to engage in any one of the series of holes, 12, formed in the flange, 13, of the eccentric bearing member.

The shaft, 14, extends through the cylindrical opening, 15, and is concentric with the cylindrical portion of the bearing member mounted in the frame, but is eccentric to the bearing of the pulley mounted on said member and parallel thereto. As the bearing member is rotated within the frame and adjusted from one position to another, it will be seen that the pulley or wheel, 7, will be shifted transversely with reference to its shaft and frame, and that thereby the looseness of the belt or sprocket chain used in driving the corresponding wheel and shaft, (not shown) of the drive, may be readily taken up and the same angular relation of the respective shafts maintained.

For the purpose of connecting the pulley or wheel to its shaft, which is mounted in fixed bearings, any suitable form of driving connection or coupling may be employed, but I prefer to use the construction shown in the drawing and comprising a coupling member or bushing, 16, which may be either keyed to the wheel, or formed integral therewith, and having a face provided with a transverse slot or groove, 17, a shaft member, 18, fixed on the shaft and having a transverse groove, 19, and an intermediate coupling member or disk, 20, having corresponding projections, 21, extending on opposite sides and substantially at right angles to each other, and engaging the grooves of the other members. The central opening through the intermediate coupling disk is of larger diameter than the shaft to allow for the lateral play of said disk, as the projections slide to and fro in said grooves during the operation of the device and the transmission of power between the pulley and shaft.

In order to automatically take up any wear of the coupling members, the grooves and the corresponding projections engaging therewith are preferably tapered in cross section, and a spring is employed for forcing said parts together. These springs, 22, are preferably mounted within recesses formed in the wheel, 7, which is slidably mounted longitudinally upon its bearing, the springs acting against the annular spring ring, 23, bearing upon the frame. By this means the coupling is kept tight at all times as the springs force the parts together and the beveled surfaces take up the wear between the coupling members. The shaft may be provided with a fixed collar, 24, bearing against the inner face of the bearing member, 8, to prevent an endwise movement of the shaft.

In a chain driving mechanism of this character, where the motion is transmitted between shafts having a certain timed relation, it is important that the coupling connection should maintain the same speed and direction of rotation between the driving and driven parts, and while I have shown one form of coupling having this function, it will be understood that my improvement is not limited thereto, since various forms of couplings, within the scope of my invention, may be devised for transmitting motion at the same speed and direction from the sprocket wheel to the shaft, and at the same time provide for the transverse adjustment of the bearing of the sprocket wheel relative to the axis of the shaft or other driven member.

From the foregoing description, it will now be apparent that I have provided a simple and durable construction which may be readily adjusted at any time to tighten the chain or belt operating upon the pair of sprocket wheels or pulleys, the power being freely transmitted between the wheel and its fixed shaft in all positions of said wheel.

Having now described my invention, what I claim as new and desire to secure by Letters Patent is:

1. The combination of an adjustable bearing member, a sprocket wheel rotatably mounted on said bearing member, a driven shaft or element, and a coupling connection for maintaining the same speed and direction of rotation between said sprocket wheel and shaft.

2. In a chain driving mechanism, the combination of a sprocket wheel having a transversely adjustable bearing, a driven shaft or element, and a coupling connection for maintaining the same speed and direction of rotation between said sprocket wheel and shaft.

3. The combination of a rotatably adjustable bearing member, a sprocket wheel rotatably mounted thereon, a shaft extending within said bearing member and eccentric thereto, and a coupling connection for maintaining the same speed and direction of rotation between said sprocket wheel and shaft.

4. The combination of a shaft, a rotatably adjustable bearing member eccentric to said shaft, means for rigidly holding said eccentric bearing in any position to which it may be adjusted, a sprocket wheel rotatably mounted on said eccentric bearing member, and a coupling connection for maintaining the same speed and direction of rotation between said sprocket wheel and shaft.

5. In a chain driving mechanism, the combination of a sprocket wheel having a transversely adjustable bearing, a shaft parallel with the axis of said bearing, the driving and driven parts each having a coupling member, and an intermediate coupling member for transmitting motion from one of said coupling members to the other, the intermediate and side coupling members having coöperating projections and grooves.

6. The combination of a support, a bearing member mounted to have a rotatable adjustment in said support and provided with a flange, means for clamping said flange to the support, said member having an eccentric portion projecting at one side of said support, a sprocket wheel rotatably mounted on said bearing, a driven member, and a driving connection between said wheel and the driven member.

7. The combination of a support, a bearing member mounted to have a rotatable adjustment in said support and provided with a flange, means for clamping said flange to the support, said member having an eccentric portion projecting at one side of said support, a sprocket wheel rotatably mounted on said bearing and having a coupling face provided with a groove, a shaft, a coupling member fixed on said shaft and having a transverse groove, and an intermediate coupling disk having transverse projections upon its opposite sides for engaging said grooves.

8. The combination of a support, an adjustable bearing member movably mounted on said support, a sprocket wheel mounted on said bearing member, a shaft extending within said bearing member, and a coupling connecting said sprocket wheel and shaft.

9. The combination of a support, a bearing member rotatably mounted in said support and having an eccentric bearing portion, means for adjusting said member in the support, a sprocket wheel mounted on said eccentric bearing, a shaft mounted eccentrically to said sprocket bearing, and concentrically with the bearing in said support, the eccentricity being constant in all positions of the bearing member, and a coupling connecting said shaft and sprocket wheel.

10. The combination of a support, a bearing member provided with a cylindrical portion having a rotatable adjustment in said support, and another cylindrical portion forming a bearing for a sprocket wheel, said cylindrical bearing portions being eccentric to each other, a shaft having a bearing within said member and concentric with the bearing in the support, a sprocket wheel rotatably mounted on said member, and a coupling connecting said wheel to said shaft.

11. The combination of a support, a bearing member provided with a cylindrical portion having a rotatable adjustment in said support, and another cylindrical portion forming a bearing for a sprocket wheel, said cylindrical bearing portions being eccentric to each other, a shaft having a bearing within said member and concentric with the bearing in the support, a sprocket wheel rotatably mounted on said member and having a coupling face provided with a transverse groove, a coupling member fixed on said shaft and having a transverse groove, and an intermediate coupling disk having transverse projections upon its opposite sides for engaging said grooves.

12. The combination of a driving wheel having a coupling member, a transversely adjustable bearing for said wheel, said wheel being slidable longitudinally upon its bearing, a shaft, a coupling member fixed on said shaft, an intermediate coupling member located between the other coupling members, said coupling members being provided with transverse grooves tapered in cross section and correspondingly tapered projections coöperating therewith, and means acting to force said wheel longitudinally against said coupling members.

13. The combination of a driving wheel having a coupling member provided with a transverse groove of tapered cross section, a transversely adjustable bearing for said wheel, said wheel being slidable longitudinally upon its bearing, a shaft, a coupling member fixed on said shaft and having a transverse groove tapered in cross section, an intermediate coupling disk having tapered projections upon its opposite sides for engaging said grooves, and a spring acting to force said wheel longitudinally against said coupling members.

FRANK L. MORSE.

Witnesses:
  D. B. Perry,
  P. C. Colt.